US010790667B2

(12) United States Patent
Miyake et al.

(10) Patent No.: US 10,790,667 B2
(45) Date of Patent: Sep. 29, 2020

(54) VOLTAGE/REACTIVE POWER CONTROL APPARATUS, METHOD, AND VOLTAGE/REACTIVE POWER CONTROL SYSTEM

(71) Applicant: Hitachi, Ltd., Chiyoda-ku, Tokyo (JP)

(72) Inventors: Toshiyuki Miyake, Tokyo (JP); Eisuke Kuroda, Tokyo (JP); Masahiro Yatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 15/777,433

(22) PCT Filed: Oct. 25, 2016

(86) PCT No.: PCT/JP2016/081530
§ 371 (c)(1),
(2) Date: May 18, 2018

(87) PCT Pub. No.: WO2017/086099
PCT Pub. Date: May 26, 2017

(65) Prior Publication Data
US 2018/0351361 A1    Dec. 6, 2018

(30) Foreign Application Priority Data

Nov. 20, 2015    (JP) ................. 2015-227425

(51) Int. Cl.
*H02J 3/18*    (2006.01)
*H02J 3/12*    (2006.01)
(Continued)

(52) U.S. Cl.
CPC .............. *H02J 3/18* (2013.01); *G05B 13/041* (2013.01); *H02J 3/00* (2013.01); *H02J 3/12* (2013.01);
(Continued)

(58) Field of Classification Search
CPC .. H02J 3/18; H02J 13/0017; H02J 3/00; H02J 13/00; H02J 3/12; H02J 2003/007;
(Continued)

(56) References Cited

U.S. PATENT DOCUMENTS

2012/0197450 A1    8/2012    Krok et al.
2013/0030598 A1*    1/2013    Milosevic ................. H02J 3/16
700/298
(Continued)

FOREIGN PATENT DOCUMENTS

JP    4-190630 A    7/1992
JP    9-322404 A    12/1997
(Continued)

OTHER PUBLICATIONS

International Search Report (PCT/ISA/210) issued in PCT Application No. PCT/JP2016/081530 dated Dec. 27, 2016 with English-language translation (Five (5) pages).
(Continued)

*Primary Examiner* — Jigneshkumar C Patel
(74) *Attorney, Agent, or Firm* — Crowell & Moring LLP

(57) ABSTRACT

There is provided a voltage/reactive power control device, method, and a voltage/reactive power control system that allow a proper control even with a control delay or in a situation where the system conditions at the time of setting the voltage reference value may not be always reproduced. A voltage/reactive power control system is applied to a power system in which a monitoring point is set in a local system divided as appropriate from the power system and the local system includes a voltage/reactive power control device capable of adjusting voltage and reactive power at the monitoring point. The voltage/reactive power control system includes: a central control unit that sets a control target value of the voltage and reactive power at the monitoring point in
(Continued)

the local system based on optimal power flow calculation using total system data on the power system, generates a correction function to correct the control target value in accordance with a change in state of the power system relating to the monitoring point by using past history information on the states of the power system, and outputs the control target value and at least one or more correction functions; a local control apparatus that, when the control target value is different from system data on the local system, uses the correction function to calculate a controlled variable for the voltage/reactive power control device necessary to attain the control target value; and a device control apparatus that controls the voltage/reactive power control device in accordance with the controlled variable from the local control apparatus.

8 Claims, 10 Drawing Sheets

(51) Int. Cl.
    *H02J 13/00*          (2006.01)
    *H02J 3/00*           (2006.01)
    *G05B 13/04*          (2006.01)

(52) U.S. Cl.
    CPC .......... *H02J 13/00* (2013.01); *H02J 13/0017* (2013.01); *H02J 2203/20* (2020.01); *Y02E 40/30* (2013.01); *Y02E 40/74* (2013.01); *Y04S 10/22* (2013.01)

(58) Field of Classification Search
    CPC ....... G05B 13/041; Y02E 40/74; Y02E 40/30; Y04S 10/22
    USPC ....................................................... 700/298
    See application file for complete search history.

(56) References Cited

U.S. PATENT DOCUMENTS

| | | | |
|---|---|---|---|
| 2013/0134779 A1* | 5/2013 | Watanabe | G05F 1/70 307/24 |
| 2014/0148966 A1* | 5/2014 | Salama | H02J 3/00 700/298 |
| 2015/0214739 A1* | 7/2015 | Shin | G05B 15/02 700/286 |
| 2015/0214741 A1 | 7/2015 | Kuroda et al. | |
| 2015/0233975 A1* | 8/2015 | Itaya | G01R 15/18 324/127 |
| 2016/0224045 A1* | 8/2016 | Wong | G05F 1/66 |

FOREIGN PATENT DOCUMENTS

| | | |
|---|---|---|
| JP | 2000-14011 A | 1/2000 |
| JP | 2002-165367 A | 6/2002 |
| JP | 2012-5277 A | 1/2012 |
| JP | 2012-175778 A | 9/2012 |
| JP | 2012-235681 A | 11/2012 |
| JP | 2014-138471 A | 7/2014 |
| JP | 2015-90580 A | 5/2015 |
| WO | WO 2015/022746 A1 | 2/2015 |

OTHER PUBLICATIONS

Japanese-language Written Opinion (PCT/ISA/237) issued in PCT Application No. PCT/JP2016/081530 dated Dec. 27, 2016 (Four (4) pages).
Japanese-language Office Action issued in counterpart Japanese Application No. 2015-227425 dated Apr. 23, 2019 with English translation (six (6) pages).
Extended European Search Report issued in counterpart European Application No. 16866101.5 dated Jun. 27, 2019 (nine (9) pages).

\* cited by examiner

VOLTAGE/REACTIVE POWER CONTROL APPARATUS, METHOD, AND VOLTAGE/REACTIVE POWER CONTROL SYSTEM

TECHNICAL FIELD

The present invention relates to a voltage/reactive power control apparatus, method, and a voltage/reactive power control system for bringing the voltage at monitoring points into an allowable range and keeping reactive power in balance in a power system.

BACKGROUND ART

With growing energy demand and electricity deregulation, power systems have been increasingly expanded in scale, and power providers and power sources have been diversified and decentralized. Therefore, it is feared that power flow in power systems will increase uncertainty, thereby resulting in degradation of power quality. Accordingly, there is a need for high-quality and stable voltage management and effective power supply.

In a power system, with reactive power and voltage varying with state changes in load, there has been conventionally performed a voltage/reactive power control to minimize power loss while satisfying the rated voltage value and the restrictions on generator reactive power. For stable power supply, it is necessary to set monitoring points at predetermined positions in the power system and control the voltage and reactive power varying from moment to moment at the monitoring points to bring close to target values or bring into prescribed ranges.

Methods for controlling the voltage and reactive power are roughly divided into a central control method, an individual control method, and a hierarchical control method.

According to the central control method, the information on the voltage and reactive power at the monitoring points in the entire target power system is collected into one place, optimization calculation is performed such that the voltage and reactive power in the entire power system fall within prescribed ranges with minimum transmission loss, and operation instructions are issued to voltage/reactive power control devices in the vicinities of the monitoring points based on the calculation results. As a voltage/reactive power control apparatus according to the central control method, PTL 1 proposes an apparatus that predicts voltage fluctuation by a feed forward control using past history data to handle a control delay resulting from a control time delay, thereby allowing the control to follow the voltage change.

According to the individual control method, the whole region of the power system is divided into sub regions (called system regions), and the voltage and reactive power are controlled such that a given reference voltage value is retained in each of the system regions. As a voltage/reactive power control apparatus according to the individual control method, PTL 2 proposes an apparatus that inputs a voltage upstream of a predetermined substation and active power and reactive power supplied by the predetermined substation into a circuit model simulating a circuit downstream of the predetermined substation to calculate controlled variables of a transformer tap and phase modifying equipment with which the reactive power supplied by the predetermined substation will satisfy prescribed conditions.

According to the hierarchical control method, the power system is divided hierarchically (called system hierarchy) by voltage class, and an arithmetic device at the highest rank of the system hierarchy controls the voltage and reactive power to maintain the reference voltage value at each rank of the system hierarchy. As a voltage/reactive power control apparatus according to the hierarchical control method, PTL 3 proposes an apparatus including individual control units that perform a voltage control in an emphatic manner while each of plural power system blocks divided hierarchically by voltage class keeps the reactive power in balance in an autonomous-distributed manner, and a central calculation unit that calculates an optimum value for control target voltage satisfying predetermined conditions for each of the blocks.

CITATION LIST

Patent Literature

PTL 1: JP 2000-14011 A
PTL 2: JP 2012-175778 A
PTL 3: JP 2002-165367 A

SUMMARY OF INVENTION

Technical Problem

According to the central control method and the hierarchical control method, the information on the entire power system is collected into a center or an upper rank of the system hierarchy and processed in one batch. This increases the amount of data transmission and data processing and causes a control delay particularly in the event of an abrupt change in the load of the power system.

To solve this issue, according to PTL 1, the voltage fluctuation is predicted and the voltage reference value for the control device is corrected such that the control can follow the voltage change. However, the prediction-based correction may yield no result as predicted. According to PTL 3, the individual control units are provided to perform voltage control in a cooperative manner while keeping the reactive power in balance in an autonomous-distributed manner. However, even if the voltages at the individual monitoring points fall within the prescribed range in an autonomous-distributed manner, the reactive power cannot be necessarily balanced in an entirely optimal manner.

According to the individual control method, the control is performed based on the reference voltage value calculated off-line in advance. However, the system conditions at the time of setting the reference value may not be always reproduced, which makes it difficult to perform the control with minimum transmission loss.

Accordingly, to solve the foregoing problems, an object of the present invention is to provide a voltage/reactive power control device, method, and a voltage/reactive power control system that allow a proper control even with a control delay or in a situation where the system conditions at the time of setting the voltage reference value may not be always reproduced.

Solution to Problem

From the foregoing matter, the present invention relates to "a voltage/reactive power control system that is applied to a power system in which a monitoring point is set in a local system divided as appropriate from the power system and the local system includes a voltage/reactive power control device capable of adjusting voltage and reactive power at the monitoring point. The voltage/reactive power control system includes: a central control unit that sets a control target value of the voltage and reactive power at the monitoring point in the local system based on optimal power flow calculation using total system data on the power system, generates a correction function to correct the control target value in accordance with a change in state of the power system relating to the monitoring point by using past history information on the states of the power system, and outputs the control target value and at least one or more correction functions; a local control apparatus that uses the correction function to calculate a controlled variable for the voltage/reactive power control device necessary to attain the control target value when the control target value obtained from the central control unit is different from system data on the local system; and a device control apparatus that controls the voltage/reactive power control device in accordance with the controlled variable from the local control apparatus".

The present invention also relates to "a voltage/reactive power control apparatus that is applied to a power system in which a monitoring point is set in a local system divided as appropriate from the power system and the local system includes a voltage/reactive power control device adjustable in accordance with a control target value of voltage and reactive power at the monitoring point. The voltage/reactive power control apparatus includes a central control unit that sets the control target value of the voltage and reactive power at the monitoring point in the local system based on optimal power flow calculation using total system data on the power system, generates a correction function to correct the control target value in accordance with a change in state of the power system relating to the monitoring point by using past history information on the states of the power system, and outputs the control target value and at least one or more correction functions. The voltage/reactive power control device is controlled by the control target value given by the voltage/reactive power control apparatus and the correction function".

The present invention also relates to "a voltage/reactive power control apparatus that is applied to a power system in which a monitoring point is set in a local system divided as appropriate from the power system and the local system includes a voltage/reactive power control apparatus adjustable by a device control apparatus operating in accordance with a control target value of voltage and reactive power at the monitoring point. The voltage/reactive power control apparatus includes: a central control unit that sets a control target value of the voltage and reactive power at the monitoring point in the local system based on optimal power flow calculation using total system data on the power system, generates a correction function to correct the control target value in accordance with a change in state of the power system relating to the monitoring point by using past history information on the states of the power system, and outputs the control target value and at least one or more correction functions; and a local control apparatus that, when the control target value obtained from the central control unit is different from system data on the local system, uses the correction function to calculate a controlled variable for the voltage/reactive power control device necessary to attain the control target value".

The present invention also relates to "a voltage/reactive power control apparatus that is applied to a power system in which a monitoring point is set in a local system divided as appropriate from the power system and the local system includes a voltage/reactive power control device adjustable by a device control apparatus operating in accordance with a control target value of voltage and reactive power at the monitoring point. The voltage/reactive power control apparatus includes: a local control apparatus that obtains a control target value of the voltage and reactive power at the monitoring point in the local system based on optimal power flow calculation using total system data on the power system and a correction function to correct the control target value in accordance with a change in state of the power system relating to the monitoring point by using past history information on the states of the power system, and when the control target value is different from system data on the local system, uses the correction function to calculate a controlled variable for the voltage/reactive power control device necessary to attain the control target value; and a device control apparatus that controls the voltage/reactive power control device in accordance with the controlled variable from the local control apparatus".

The present invention also relates to "a voltage/reactive power control method for a power system in which a monitoring point is set in a local system divided as appropriate from the power system and the local system includes a voltage/reactive power control device capable of adjusting voltage and reactive power at the monitoring point. The voltage/reactive power control method includes: setting a control target value of the voltage and reactive power at the monitoring point in the local system based on optimal power flow calculation using total system data on the power system; generating a correction function to correct the control target value in accordance with a change in state of the power system relating to the monitoring point by using past history information on the states of the power system; when the control target value is different from system data on the local system, using the correction function to calculate a controlled variable for the voltage/reactive power control device needed to attain the control target value; and controlling the voltage/reactive power control device in accordance with the controlled variable".

Advantageous Effects of Invention

According to the present invention, it is possible to perform a proper control even with a control delay or in a situation where the system conditions at the time of setting the voltage reference value may not be always reproduced.

More specifically, according to examples of the present invention, it is possible to, in the event of a control delay, re-calculate the control target value on the control side by generating the correction function for re-calculating the control target value with less transmission loss, for example, thereby implementing a control with less transmission loss as compared to the central control method and the hierarchical control method. In addition, it is possible to perform a control with less transmission loss in the entire system as compared to the individual control method.

DESCRIPTION OF EMBODIMENTS

Examples of the present invention will be described below with reference to the drawings.

Example 1

Figure 1:
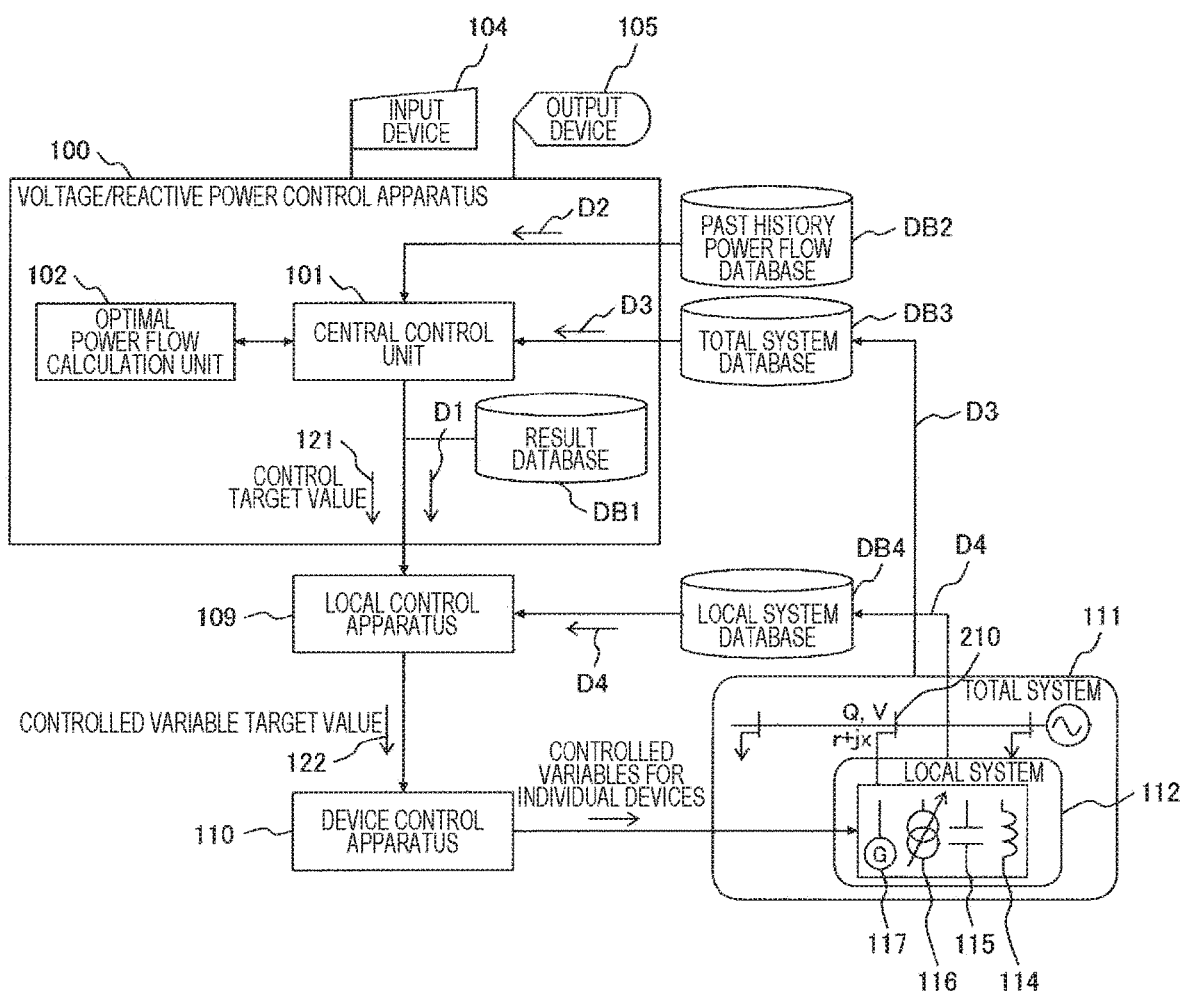
FIG. 1 is a block diagram illustrating an overall configuration of a voltage/reactive power control system including a voltage/reactive power control apparatus according to Example 1 of the present invention.

FIG. 1 is a block diagram illustrating an entire configuration of a voltage/reactive power control system including a voltage/reactive power control apparatus according to Example 1 of the present invention.

Referring to FIG. 1, a total system 111 in a power system as a monitoring and control target includes a plurality of local systems 112 as appropriately divided units. The local systems 112 include pluralities of shunt reactors 114 as phase modifying equipment, power capacitors 115, transformers with on-load tap changers 116, generators with automatic voltage regulators 117, and others. The local systems 112 can be said to be sub systems appropriately divided from the total system 111 in the power system from the viewpoint of voltage class or region.

A voltage/reactive power control apparatus 100 is configured to monitor and control the power system, and includes a central control unit 101, an optimal power flow calculation unit 102, a result database DB1, an input device 104, and an output device 105. The voltage/reactive power control apparatus 100 is connected to a past history power flow database DB2 and a total system database DB3 via communication networks enabling data transmission and reception.

There are provided outside the voltage/reactive power control apparatus 100 a local control apparatus 109 that calculates a control target value by using an output (a control target value 121 and a correction function D1) from the voltage/reactive power control apparatus 100 and local system data D4 from a local system database DB4 and provides the same to a device control apparatus 110. The local control apparatus 109 provides a target signal for controlled variable (controlled variable target value) 122 to the voltage/reactive power control devices such as the shunt reactors 114 as phase modifying equipment, the power capacitors 115, the transformers with on-load tap changers 116, and the generators with automatic voltage regulators 117 in the local systems 112.

The voltages and the like of the local systems 112 are measured by measurement devices installed at monitoring points 210. The monitoring points 210 are preset at predetermined positions in the total system 111. Telemeter information (hereinafter, called TM information) such as voltages, currents, active power, and reactive power measured at the monitoring points 210 and supervision information (hereinafter, called SV information) about the operating states of the power facilities such as generators and the like and phase modifying equipment are collected as total system data D3 into a total system database DB3 in a specific time period. Similarly, the TM information and the SV information on the local systems 112 in the total system data D3 are collected as local system data D4 into the local system database DB4.

According to the configuration illustrated in FIG. 1, the control target value 121 provided by the voltage/reactive power control apparatus 100 is corrected as appropriate by the correction function D1 and the local system data D4 to determine controlled variables for the voltage/reactive power control devices. Accordingly, the control target value 121 for optimizing the total system 111 is transferred to the control reflecting the current states of the local systems 111.

The input device 104 is an interface for the user to provide predetermined instructions to the voltage/reactive power control apparatus 100. The input device 104 includes a keyboard, a mouse, a touch panel and/or operation buttons, for example.

The output device 105 is an interface for the voltage/reactive power control apparatus 100 to provide predetermined information to the user. The output device 105 includes a display and the like, for example.

The functions of the elements 101 to 105 constituting the voltage/reactive power control apparatus 100 are implemented by a central processing unit (CPU), a memory, and a storage device (all not illustrated) included in the voltage/reactive power control apparatus 100, for example. For example, the CPU reads and executes predetermined computer programs from the storage device to implement the functions of the foregoing elements 101 to 105.

Figure 2:
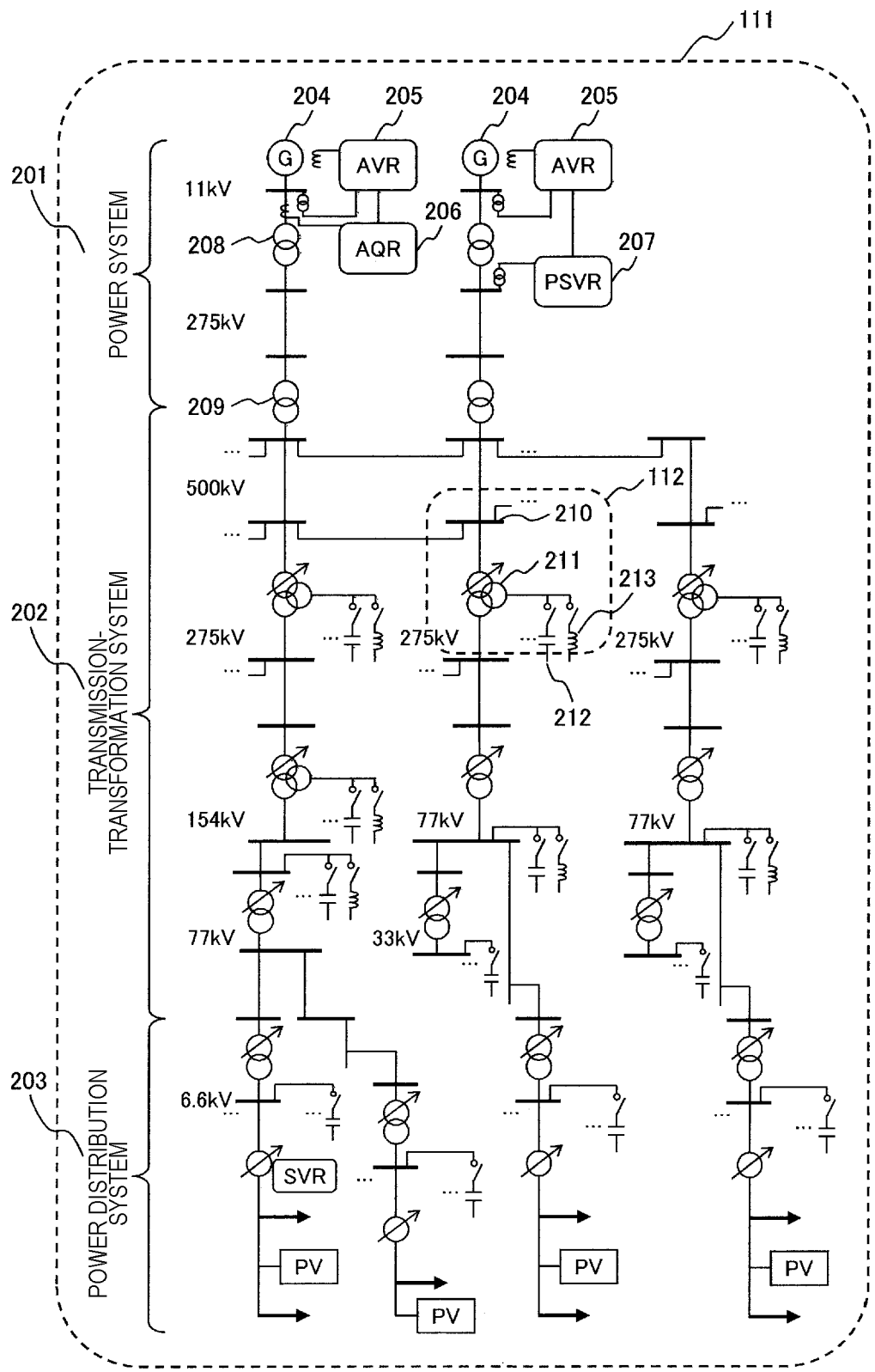
FIG. 2 is a diagram illustrating the relationship between a total system and a local system in an entire power system.

FIG. 2 is a diagram illustrating the relationship between the total system 111 and the local system 112 in the entire power system. Referring to FIG. 2, the total system 111 is roughly divided into a power source system 201, a transmission-transformation system 202, and a power distribution system 203. Generators 204 in the power source system 201 include an automatic voltage regulator (hereinafter, referred to as AVR) 205 and an automatic reactive power (Q) regulator (hereinafter, referred to as AQR) 206, or a power system voltage regulator (hereinafter, referred to as PSVR) 207. They contribute to control of voltage and reactive power in the power system and can be targets of control by the device control apparatus 110 illustrated in FIG. 1 as voltage/reactive power control devices.

The power generated by the generator 204 is raised in voltage from 11 kV at the power generation end to 275 kV by a transformer 208. The power is further raised in voltage from 275 kV to 500 kV by another transformer 209 and is transmitted to a distant destination.

The local systems 112 are sub systems divided as appropriate from the total system 111 in the power system from the viewpoint of voltage class or region. The local system 112 illustrated in FIG. 2 is formed in a region where a power capacitor 212 and a shunt reactor 213 are connected to a tertiary winding of a transformer with on-load tap changer 211 as voltage/reactive power control device at a monitoring point 210 at a voltage class of 500 kV, for example.

Example 1 will be described focusing on the voltage/reactive power control apparatus 100 according to the central control method or the hierarchical control method, which sends the control target value 121 to the local control apparatus 109 that controls the voltage and reactive power of the transformer with on-load tap changer 211 in the local system 112.

Figure 3:
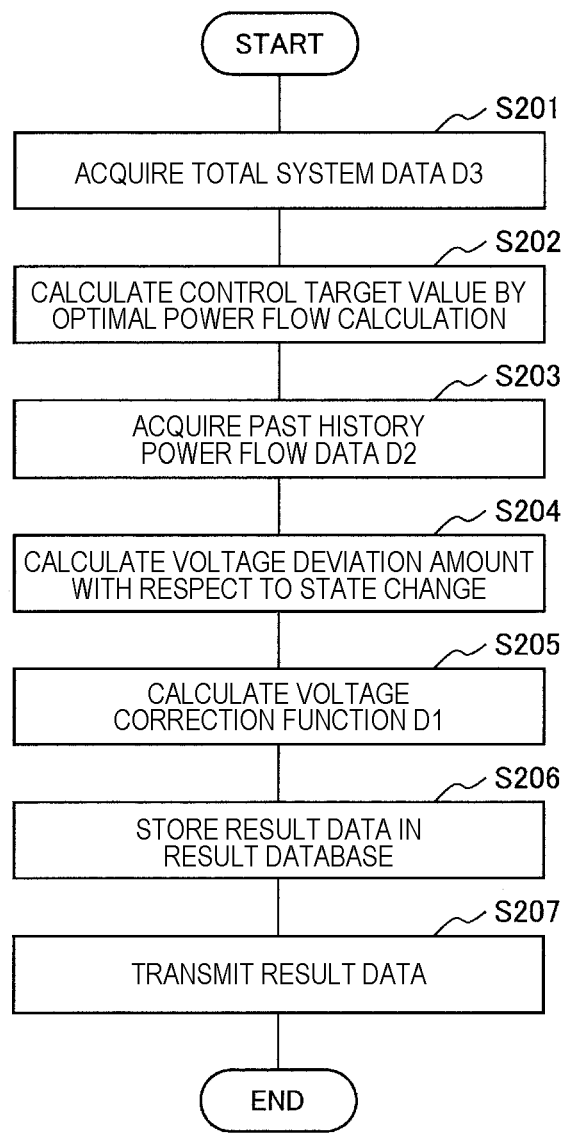
FIG. 3 is a flowchart of an entire process performed by the voltage/reactive power control apparatus.

FIG. 3 is a power flowchart of an entire process performed by the voltage/reactive power control apparatus 100 according to Example 1. The central control unit 101 of the voltage/reactive power control apparatus 100 illustrated in FIG. 1 acquires the total system data D3 from the total system database DB3 (process step S201), and the optimal power flow calculation unit 102 calculates the control target value 121 (process step S202). In this part of the process, the voltage/reactive power for optimizing the power flow in the total system 111 are calculated, and only data regarding the local system 112 illustrated in FIG. 2 is extracted from all the calculated data and is output as the control target value 121 for the local system 112. The local control target value 121 for optimizing the overall state is given to each of the plurality of local systems.

Then, the central control unit 101 acquires past history power flow data D2 from the past history power flow database DB2 for the state of the power system (process step S203), and calculates voltage deviation amounts with respect to the state changes at a plurality of time cross sections (process step S204). Subsequently, the central control unit 101 calculates correction functions D1 from the voltage deviation amounts at the time cross sections (process step S205), and stores the correction functions D1 in the result database DB1 (process step S206). Then, the central control unit 101 transmits the control target value 121 and at least one or more of the correction functions D1 to the local control apparatus 109 (process step S207).

In this part of the process, the correction function D1 is given as an index for local correction because the control target value 121 for the local system 112 determined from the viewpoint of overall optimization may not be necessarily optimal in the actual control of the local system 112. The correction function D1 is an index for determining the degree of correction to be made at the time of correction.

Various examples of the correction function D1 will be described below with reference to FIGS. 4 to 11. The correction function D1 is a function representing the relationship between the voltage of the power system monitoring point 210 as control target value and the controlled variable provided by the device control apparatus 110. FIGS. 4 to 11 illustrate functions with voltage deviation on the vertical axis and controlled variable deviation on the horizontal axis. There is a plurality of controlled variables provided by the device control apparatus 110. FIGS. 4 to 11 thus illustrate correction functions D1 for each of presumed controlled variables.

Figure 4:
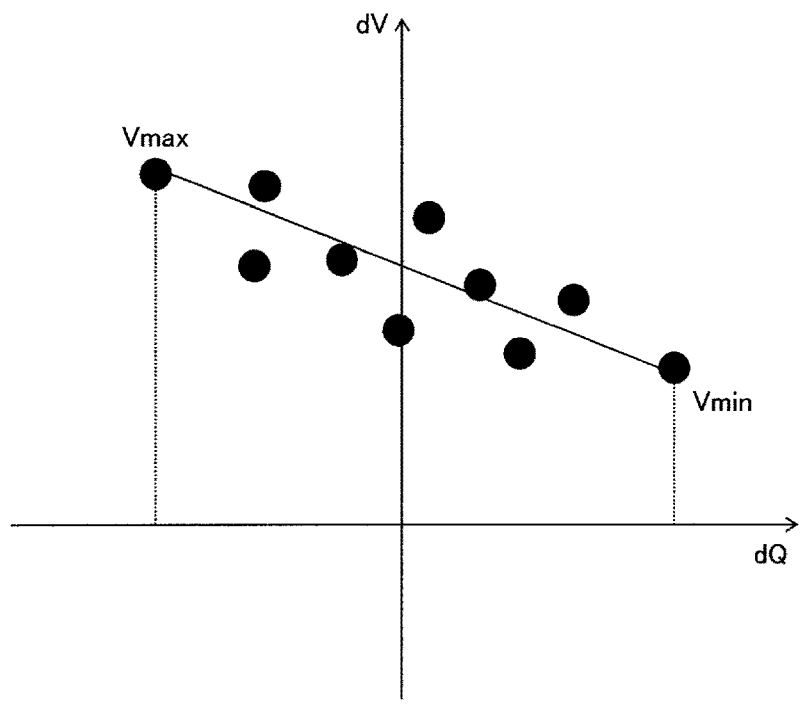
FIG. 4 is a diagram illustrating a correction function of a voltage target value in accordance with difference in reactive power.

FIG. 4 is a diagram illustrating an example of the correction function D1 in Example 1 in which the controlled variable indicates reactive power. FIG. 4 illustrates an example of the correction function D1 that represents the relationship between reactive power difference dQ (on the horizontal axis) and voltage change amount dV (change amount on the vertical axis). In this case, the change amount dV of the voltage target value in accordance with the difference dQ in reactive power between the time of optimal power flow calculation and the time of device control relating to the monitoring point 210 in the local system 112 at a plurality of time cross sections is identified as linear function by least-squares method or the like. For example, a correction function is assumed such that the change amount dV of the voltage target value with respect to the difference dQ in reactive power at a specific time cross section t is expressed by Formula (1) using numbers A and B as follows:

[Mathematical Formula 1]

$$dV(t)=A*dQ(t)+B \quad (1)$$

Figure 5:
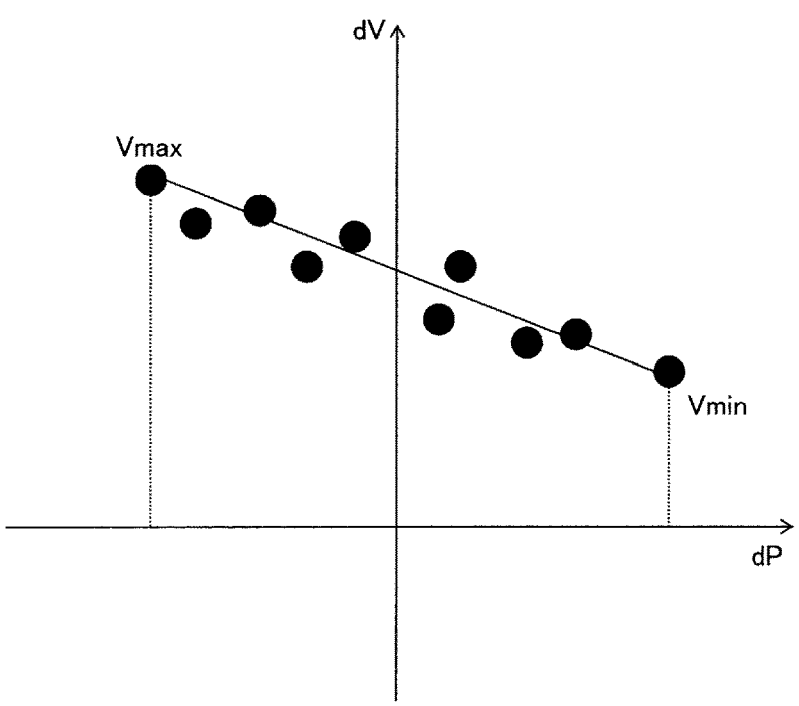
FIG. 5 is a diagram illustrating a correction function of a voltage target value in accordance with difference in active power.

FIG. 5 is a diagram illustrating another example of correction function in Example 1, which is a correction function of the voltage target value in accordance with difference in active power. Referring to FIG. 5, the change amount dV of the voltage target value in accordance with difference dP in active power between the time of optimal power flow calculation and the time of device control relating to the monitoring point 210 in the local system 112 at a plurality of time cross sections is identified as linear function by least-squares method or the like.

Figure 6:
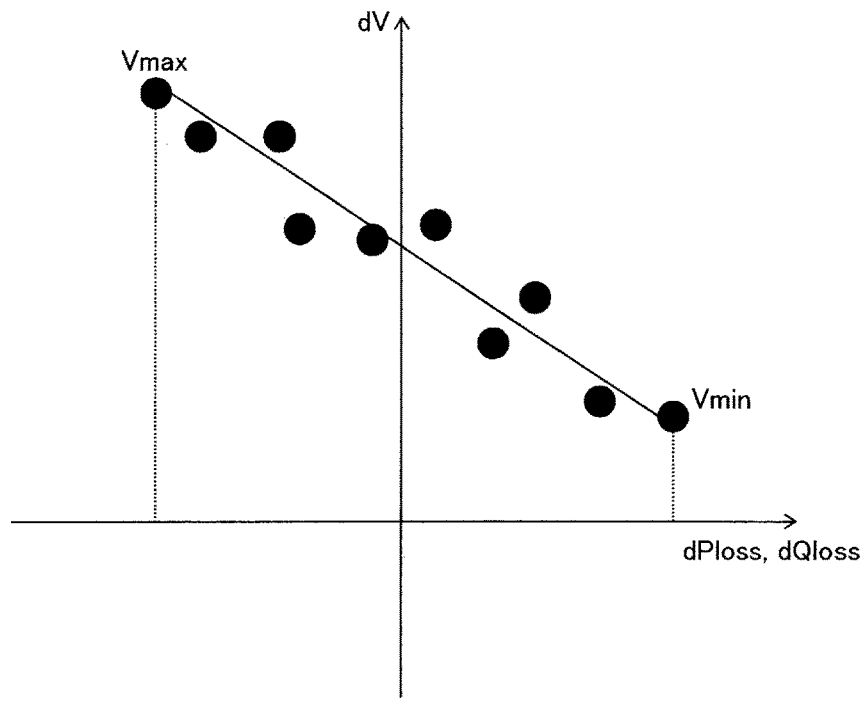
FIG. 6 is a diagram illustrating a correction function of a voltage target value in accordance with difference in power loss.

FIG. 6 is a diagram illustrating another example of correction function in Example 1, which is a correction function of the voltage target value in accordance with difference in power loss. Referring to FIG. 6, the change amount dV of the voltage target value in accordance with difference dPloss in reactive power loss or difference dQloss in active power loss between the time of optimal power flow calculation and the time of device control relating to the monitoring point 210 in the local system 112 at a plurality of time cross sections is identified as linear function by least-squares method or the like.

Figure 7:
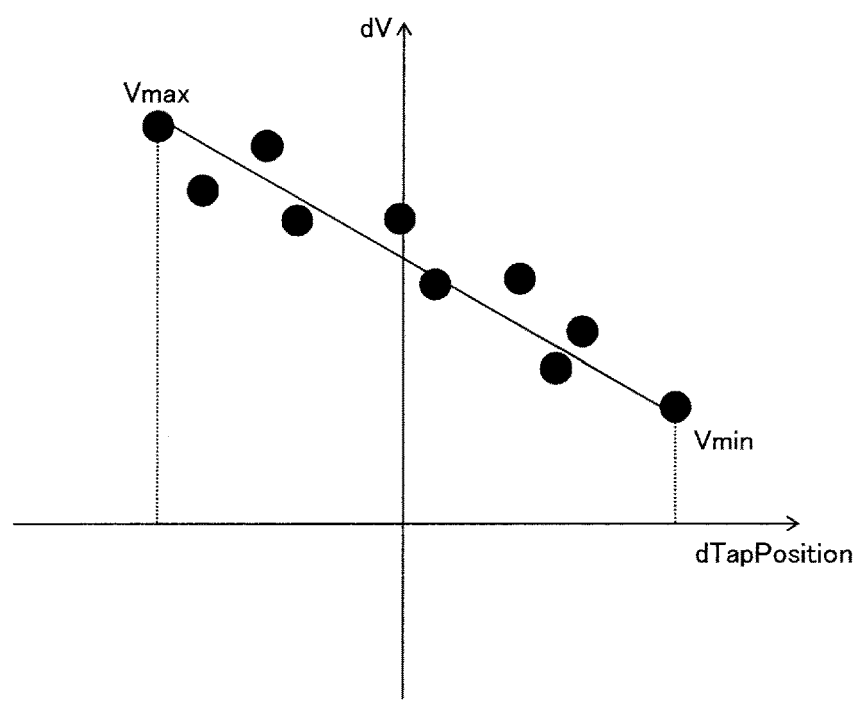
FIG. 7 is a diagram illustrating a correction function of a voltage target value in accordance with difference in transformer tap position.

FIG. 7 is a diagram illustrating another example of correction function in Example 1, which is a correction function of the voltage target value in accordance with difference in transformer tap position. Referring to FIG. 7, the change amount dV of the voltage target value in accordance with difference dTapPosition in transformer tap position between the time of optimal power flow calculation and the time of device control relating to the monitoring point 210 in the local system 112 at a plurality of time cross sections is identified as linear function by least-squares method or the like.

Figure 8:
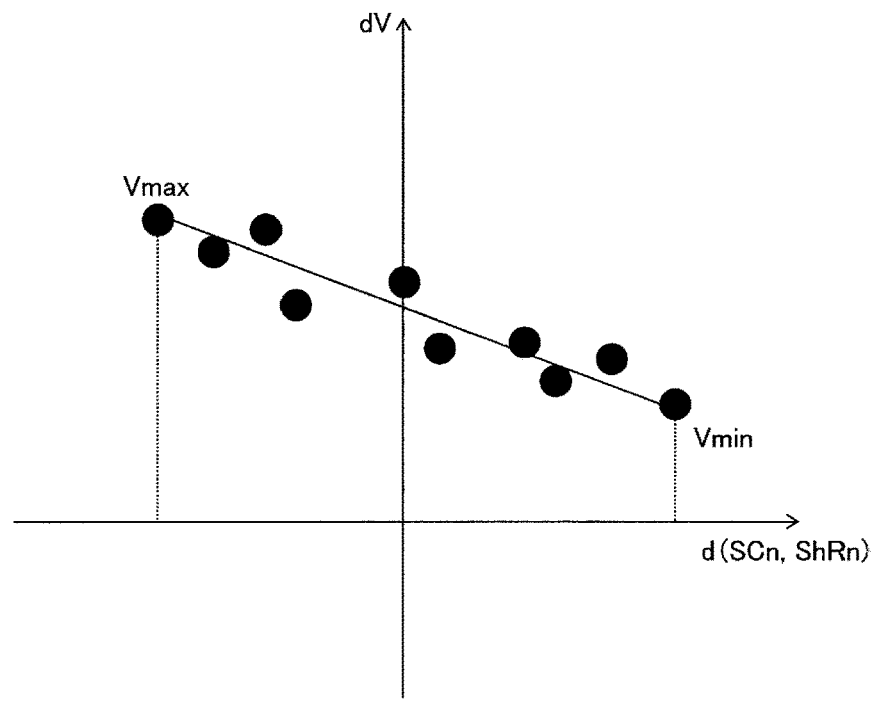
FIG. 8 is a diagram illustrating a correction function of a voltage target value in accordance with difference in the number of phase modifying devices introduced into a substation.

FIG. 8 is a diagram illustrating another example of correction function in Example 1, which is a correction function of the voltage target value in accordance with difference in the number of phase modifying devices introduced in a substation. Referring to FIG. 8, the change amount dV of the voltage target value in accordance with difference d(SCn, ShRn) in the number of phase modifying devices introduced in a substation between the time of optimal power flow calculation and the time of device control relating to the monitoring point 210 in the local system 112 at a plurality of time cross sections is identified as linear function by least-squares method or the like.

Figure 9:
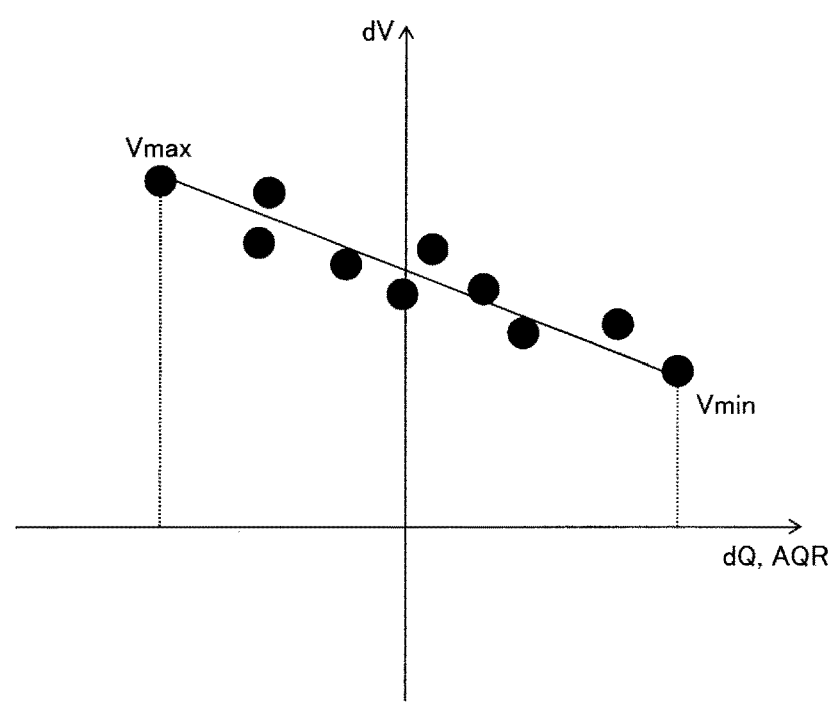
FIG. 9 is a diagram illustrating a correction function of a voltage target value in accordance with difference in reactive power generated by a reactive power adjuster included in a generator.

FIG. 9 is a diagram illustrating an example of correction function in Example 1, which is a correction function of the voltage target value in accordance with difference in reactive power generated by a reactive power regulator included in a generator. Referring to FIG. 9, the change amount dV of the voltage target value in accordance with difference dQ, AQR in reactive power generated by a reactive power regulator included in a generator between the time of optimal power flow calculation and the time of device control relating to the monitoring point 210 in the local system 112 at a plurality of time cross sections is identified as linear function by least-squares method or the like.

Figure 10:
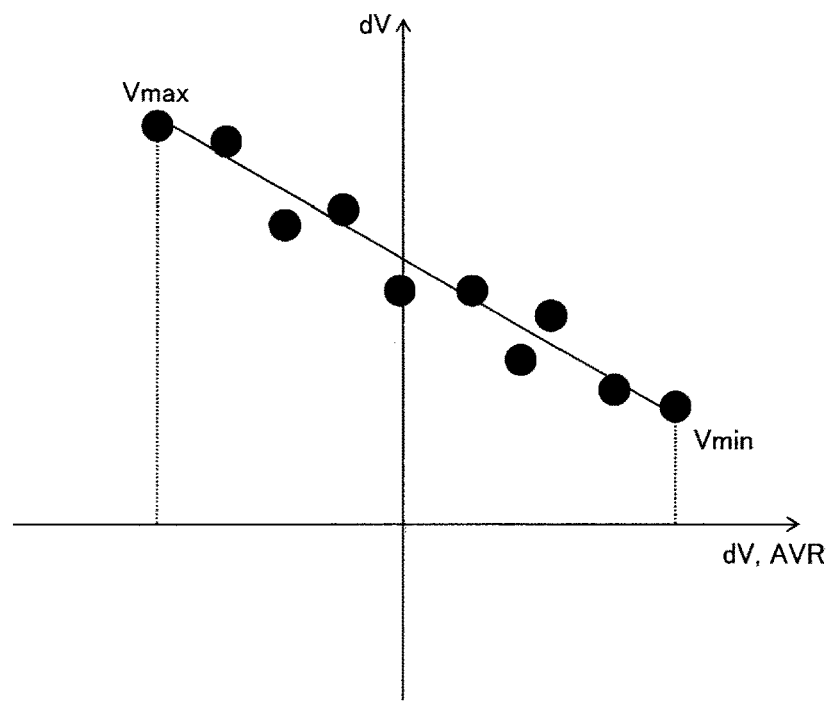
FIG. 10 is a diagram illustrating a correction function of a voltage target value in accordance with difference in voltage of an automatic voltage adjuster included in a generator.

FIG. 10 is a diagram illustrating an example of correction function in Example 1, which is a correction function of the voltage target value in accordance with difference in voltage of an automatic voltage regulator included in a generator. Referring to FIG. 10, the change amount dV of the voltage target value in accordance with difference dV and AVR in voltage of an automatic voltage regulator included in a generator between the time of optimal power flow calculation and the time of device control relating to the monitoring point 210 in the local system 112 at a plurality of time cross sections is identified as linear function by least-squares method or the like.

Figure 11:
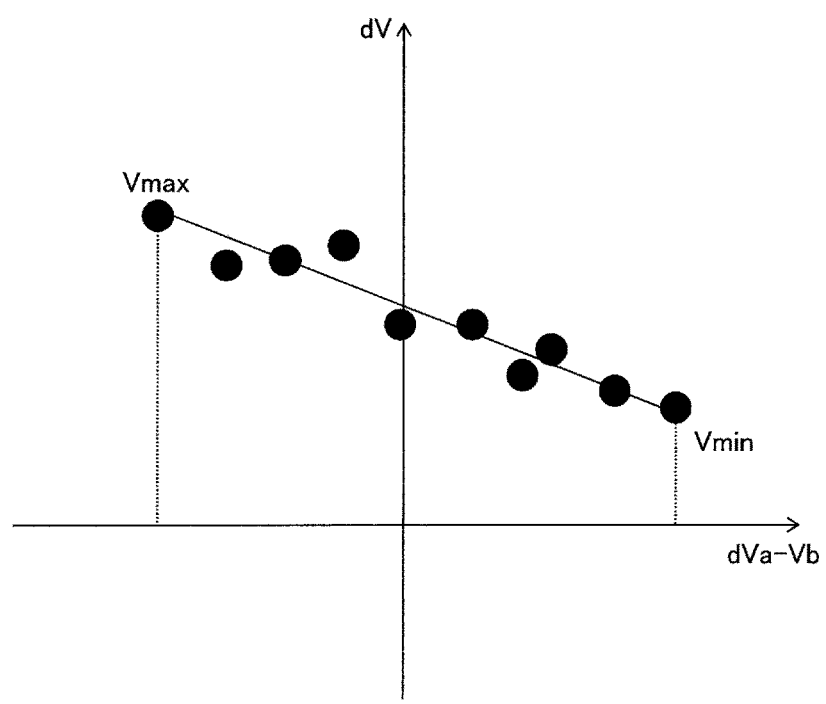
FIG. 11 is a diagram illustrating a correction function of a voltage target value in accordance with difference in voltage between the time of optimal power flow calculation and the time of device control in relation to a monitoring point and other monitoring points.

FIG. 11 is a diagram illustrating an example of correction function in Example 1, which is a diagram illustrating a correction function of a voltage target value in accordance with the difference in voltage between the time of optimal power flow calculation and the time of device control in relation to a monitoring point and other monitoring points. Referring to FIG. 11, the change amount dV of the voltage target value in accordance with difference dVa–Vb in voltage between the time of optimal power flow calculation and the time of device control relating to the monitoring point 210 and another monitoring point in the local system 112 at a plurality of time cross sections is identified as linear function by least-squares method or the like.

As apparent from the examples illustrated in FIGS. 4 to 11, the correction function D1 can be said to be determined sensitivity of the monitoring point voltage to the controlled variable. The central control unit 101 outputs from the output device the control target value 121 stored in the result database DB1 and at least one or more of the correction functions D1. In this case, one or more of the correction functions D1 illustrated in FIGS. 4 to 11 are generated and given in accordance with the device control apparatus 110 existing in the local system 112 and the type of the controlled variable from the device control apparatus 110.

The local control apparatus 109 inputs the control target value 121 and one or more correction functions D1 to the local system 112. The correction function D1 is one or more illustrated in FIGS. 4 to 11. Regarding the voltage data on the vertical axis of the correction function D1, the local control apparatus 109 determines the difference dV between data D3 at time t1 of data acquisition for optimal power flow calculation and data D4 at time t2 of data acquisition for device control. When there is no fluctuation in the voltage data within the time difference, the local control apparatus 109 does not correct the control target value 121 by the correction function D1.

When there is fluctuation in the voltage data within the time difference, the local control apparatus 109 corrects the control target value 121 by the correction function D1. For example, when the voltage difference dV occurs between times t1 and t2 in the case of FIG. 4, the local control apparatus 109 determines the controlled variable necessary for the device control apparatus 110 to eliminate the voltage difference dV as controlled variable target value 122, and provides the controlled variable target value 122 to the device control apparatus 110 for the voltage/reactive power control devices in the local system 112 to control the voltage/reactive power control devices.

The relationship among the control target value 121, the controlled variable target value 122, and the correction function D1 will be described taking a tap-equipped transformer illustrated in FIG. 7 as an example. For example, it is assumed that the monitoring point voltage is 100 V at the time of total system calculation, and the monitoring point voltage is 95 V at the time when the individual device control is about to start. The control target value 121 specifies the monitoring point voltage as 100V, and a voltage increase by 5 V is required to attain this. Accordingly, it is necessary to give an instruction for raising the transformer tap position by one step as the controlled variable target value 122 from the characteristics illustrated in FIG. 7. In this case, the controlled variable given by the device control apparatus 110 to the facilities means the controlled variable for raising the transformer tap position by one step.

For operation of the power system, only the time difference in voltage equal to or more than a predetermined limit may be reflected on the correction control to prevent a disturbance caused by frequent control. Otherwise, in the case where there is a plurality of voltage/reactive power control devices in the local system, the device control apparatus 110 may not control all the devices but may control the most effective voltage/reactive power control device.

Example 1 illustrated in FIG. 1 can be said to be a voltage/reactive power control apparatus according to the central control method in the voltage/reactive power control system. As the results of the power flow calculation with the voltage/reactive power control apparatus in the center, the voltage/reactive power control apparatus outputs the control target value and the correction function D1 for each local system. Individually, Example 1 is a role-sharing system configuration in which the local control apparatus in each local system corrects as appropriate the control target value 121 by using the local system data D4 from the local system database DB4 to obtain the controlled variable target value 122 and control the voltage/reactive power control device in the local system.

Example 2

In contrast, Example 2 is a voltage/reactive power control apparatus according to the individual control method. In this case, Example 2 is a role-sharing system configuration in which the voltage/reactive power control apparatus is arranged for each local system to correct as appropriate the control target value and the correction function D1 to the local system obtained from the higher rank by using the local system data D4 from the local system database DB4 and control the voltage/reactive power control device in the local system.

Figure 12:
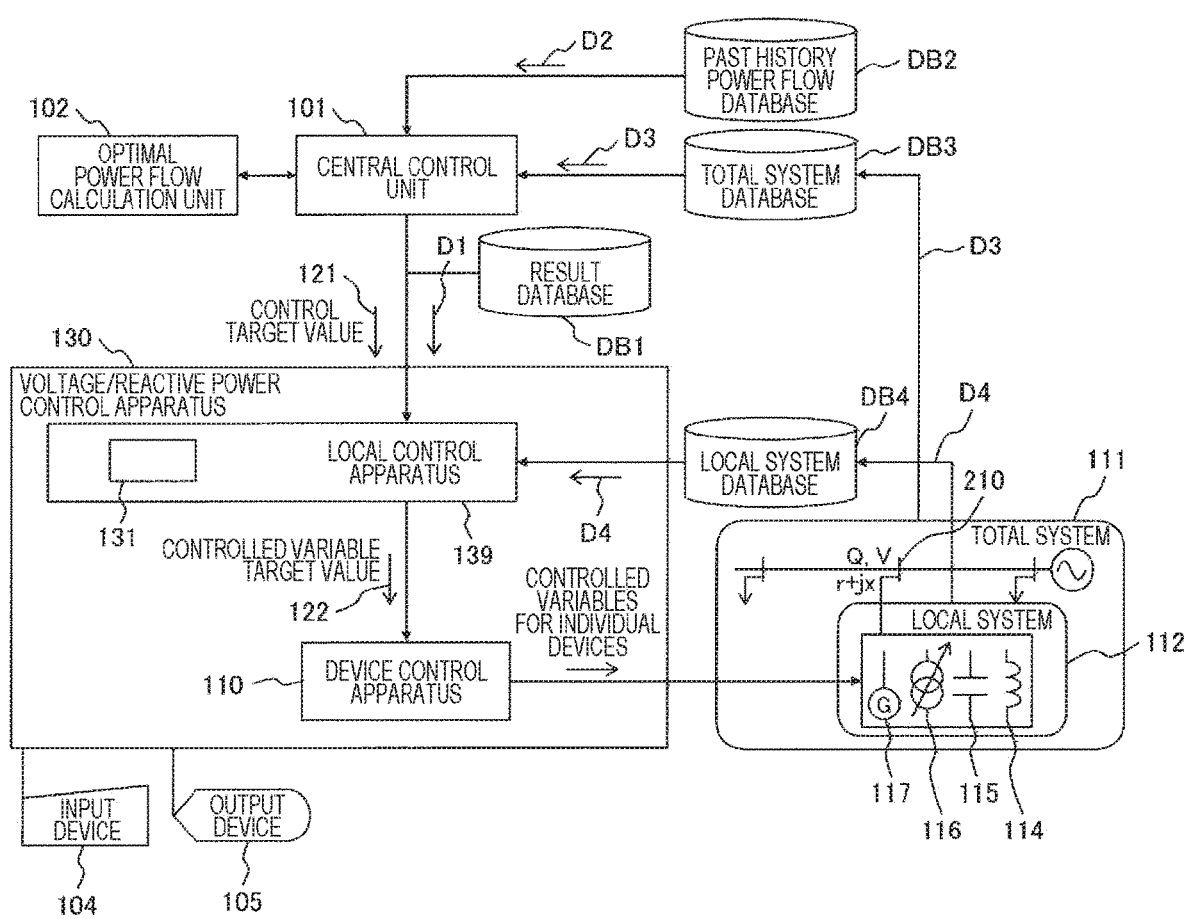
FIG. 12 is a block diagram illustrating a configuration of a voltage/reactive power control apparatus according to Example 2 of the present invention.

FIG. 12 is a block diagram illustrating a configuration of a voltage/reactive power control apparatus according to Example 2 of the present invention. A voltage/reactive power control apparatus 130 in Example 2 includes a local control apparatus 109 with a control target value correction unit 131 and a device control apparatus 110. A past history power flow database DB2, a total system database DB3, and a local system database DB4 are connected to the voltage/ reactive power control apparatus 130 as appropriate directly or indirectly via communication networks capable of data transmission and reception. The other configurations illustrated in FIG. 12 are the same as those described above with reference to FIG. 2, and descriptions thereof will be omitted here.

When determining with the local system data D4 from the local system database DB4, the control target value 121 transmitted from the central control apparatus 101, and the correction function D1 as inputs that there will occur a power flow difference between the local system information D4 at the time of output of the control target value 121 from the central control apparatus 101 and the local system information D4 at the time of input of the control target value 121 and the correction function D1, the control target value correction unit 131 in a local control apparatus 139 inputs the value of the power flow difference to the correction function D1 and outputs the same as the corrected controlled variable target value 122. When not determining there will occur a power flow difference, the control target value correction unit 131 in the local control apparatus 139 outputs the value of the power flow difference as it is.

Figure 13:
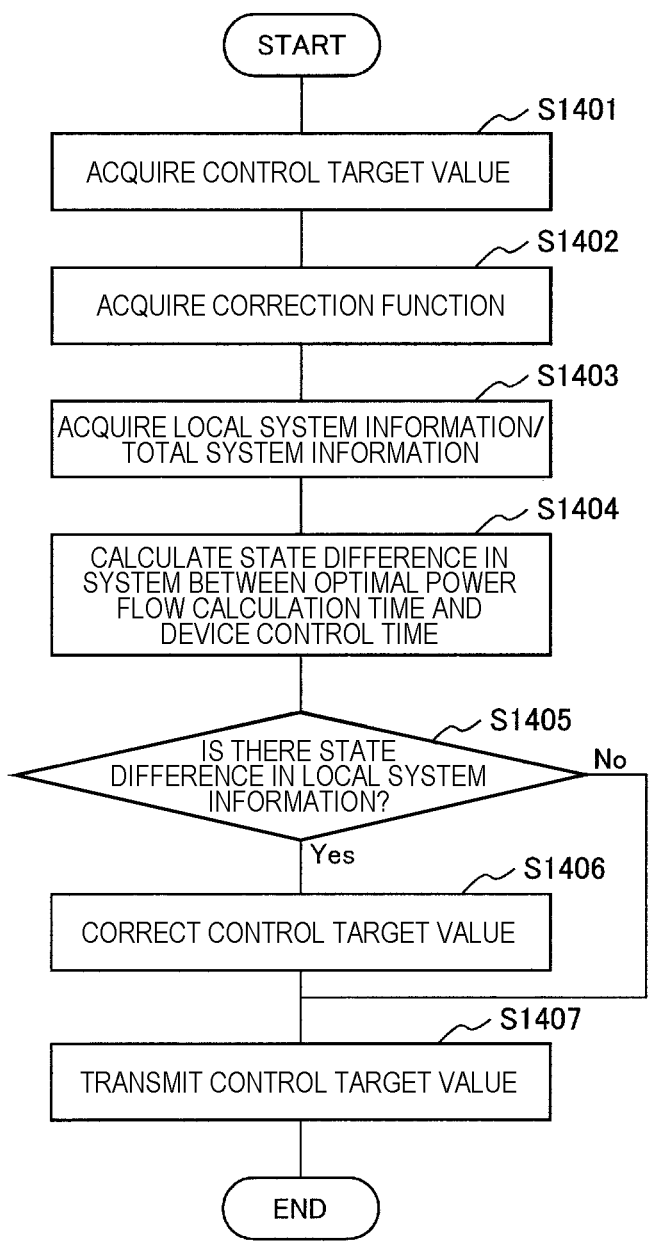
FIG. 13 is a flowchart of an entire process performed by the voltage/reactive power control apparatus according to Example 2.

FIG. 13 is a flowchart of an entire process performed by the voltage/reactive power control apparatus 130 according to Example 2. The control target value correction unit 131 of the voltage/reactive power control apparatus 130 acquires the control target value from the central control apparatus 101 (process step S141), and acquires the correction function (process step S142). Subsequently, the control target value correction unit 131 acquires the local system information D4 from the local system database DB4 and the total system information D3 from the total system database DB3 (process step S143), and calculates a difference in system state between the time of the optimal power flow calculation and the time of device control (process step S144). When determining that there is a difference in the system information state (process step S145) and there is a difference in the system information state, the control target value correction unit 131 obtains the controlled variable target value 122 based on the correction function (process step S146). Finally, the control target value correction unit 131 transmits the control target value to the device control apparatus 110 (process step S147).

The voltage/reactive power control apparatus 130 in Example 2 preferably inputs at least one of the control target value stored in the result database DB1 and the correction function.

Example 3

Example 3 is a voltage/reactive power control apparatus according to the central control method as well. The central control method in Example 3 is different from that in Example 1 in that the voltage/reactive power control apparatus includes a local control apparatus. Therefore, the device control apparatus is given a signal allowing for the correction of controlled variable fluctuation resulting from the time difference between the time of optimal power flow calculation and the time of device control.

Figure 14:
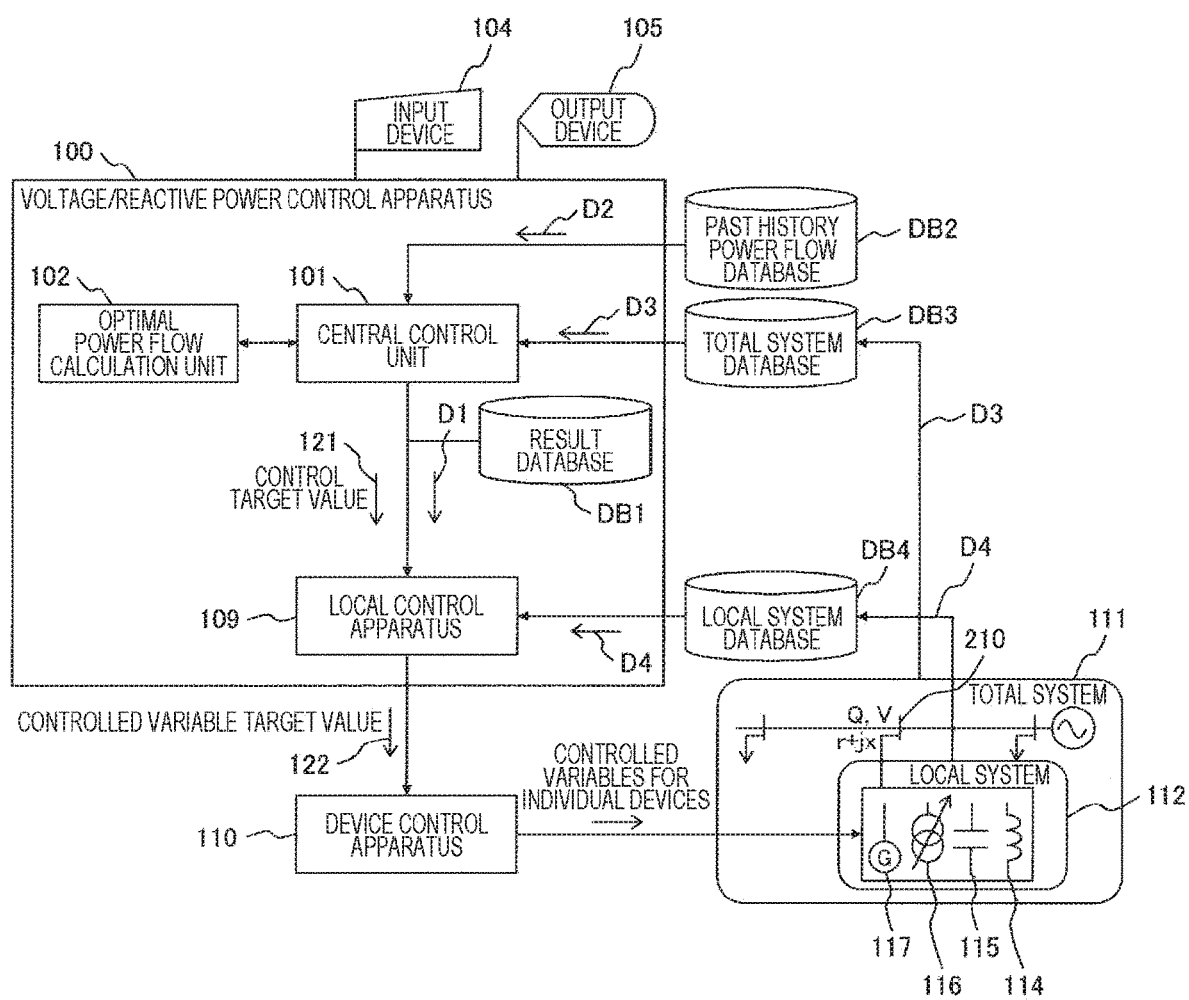
FIG. 14 is a block diagram illustrating a configuration of a voltage/reactive power control apparatus according to Example 3 of the present invention.

A voltage/reactive power control apparatus 100 in Example 3 illustrated in FIG. 14 includes a local control apparatus 109. In this configuration, the central control apparatus 101 calculates the control target value 121 to be passed from the optimal power flow calculation unit 102 to the local control apparatus 109 with the total system data D3 from the total system database DB3 as an input, and transmits the same to the local control unit 109. In addition, with the past history power flow data D2 from the past history power flow database DB2 as an input, the central control unit 101 calculates the correction function D1 involved in a change in power flow state in the control target value 121, and stores the correction function D1 in the result database DB1 and transmits the same to the local control unit 109.

The local control apparatus 109 includes a control target value determination and correction unit that, with the local system data D4 transmitted from the local system database DB4, the control target value 121 transmitted from the central control unit 101, and the correction function D1 as inputs, when determining that there will occur a power flow difference between the local system information D4 at the time of output of the control target value 121 output from the voltage/reactive power control apparatus 100 and the local system information D4 at the time of input of the control target value 121 and the correction function D1, inputs the value of the power flow difference into the correction function D1 and outputs the corrected control target value, and when not determining that there will occur a power flow difference, outputs the control target value as it is.

REFERENCE SIGNS LIST

100 voltage/reactive power control apparatus
101 central control unit
102 optimal power flow calculation unit
DB1 result database
104 input device
105 output device
DB2 past history power flow database
DB3 total system database
DB4 local system database
109 local control apparatus
110 device control apparatus
111 total system
112 local system
210 monitoring point
114 shunt reactor
115 power capacitor
116 transformer with on-load tap changer
117 generator with automatic voltage regulator

The invention claimed is:

1. A voltage/reactive power control apparatus that is applied to a power system in which a monitoring point is set in a local system divided as appropriate from the power system and the local system includes a voltage/reactive power control device adjustable in accordance with a control target value of voltage and reactive power at the monitoring point, wherein
the voltage/reactive power control apparatus includes a central control unit that sets the control target value of the voltage and reactive power at the monitoring point in the local system based on optimal power flow calculation using total system data on the power system, generates a correction function to correct the control target value in accordance with a change in state of the power system relating to the monitoring point by using past history information on the states of the power system, and outputs the control target value and the correction function,
the voltage/reactive power control device is controlled by the control target value given by the voltage/reactive power control apparatus and the correction function,
the correction function is a difference between a first voltage change amount at a time of the optimal power flow calculation and a second voltage change at a time of control of the voltage/reactive power control device at the monitoring point, and the power system includes a local control apparatus that, when the control target value obtained from the central control unit is different from system data on the local system, calculates a controlled variable for the voltage/reactive power control device needed to attain the control target value by using the correction function, and the voltage/reactive power control device is controlled via a device control apparatus operating in accordance with the control target value of the voltage and reactive power at the monitoring point.

2. The voltage/reactive power control apparatus according to claim 1, wherein function of the central control unit is incorporated into the local control apparatus.

3. A voltage/reactive power control system, wherein the local system includes a plurality of voltage/reactive power control devices operated via a device control apparatus adjustable in accordance with a control target value of the voltage and reactive power at the monitoring point, and the voltage/reactive power control device is operated by the voltage/reactive power control apparatus according to claim 1.

4. The voltage/reactive power control system according to claim 3, wherein the local system includes a plurality of kinds of voltage/reactive power control devices capable of adjusting the voltage and reactive power at the monitoring point and the correction function includes a plurality of kinds of correction functions in accordance with the kinds of the voltage/reactive power control devices.

5. The voltage/reactive power control system according to claim 3, wherein when the control target value of the voltage and reactive power at the monitoring point takes values different between the time of optimal power flow calculation using the total system data and the time of control execution by the local control apparatus, the voltage/reactive power control apparatus calculates a controlled variable for the voltage/reactive power control device needed to attain the control target value using the correction function.

6. The voltage/reactive power control system according to claim 3, wherein the correction function determines the relationship between the control target value and the controlled variable for the voltage/reactive power control device.

7. The voltage/reactive power control system according to claim 3, wherein the correction function determines the relationship between the control target value and the controlled variable for the voltage/reactive power control device, and the controlled variable relates to reactive power, active power, power loss, transformer tap position, and number of introduced phase modifying devices in the voltage/reactive power control device, one or more of which is obtained by the central control unit.

8. A voltage/reactive power control method for a power system in which a monitoring point is set in a local system divided as appropriate from the power system and the local system includes a voltage/reactive power control device capable of adjusting voltage and reactive power at the monitoring point, the method comprising:

setting, by a central control unit, a control target value of the voltage and reactive power at the monitoring point in the local system based on optimal power flow calculation using total system data on the power system;

generating a correction function to correct the control target value in accordance with a change in state of the power system relating to the monitoring point by using past history information on the states of the power system;

when the control target value is different from system data on the local system, using the correction function to calculate a controlled variable for the voltage/reactive power control device needed to attain the control target value; and controlling the voltage/reactive power control device in accordance with the controlled variable;

wherein the correction function is a difference between a first voltage change amount at a time of the optimal power flow calculation and a second voltage change amount at a time of controlling the voltage/reactive power control device at the monitoring point, and wherein, when the control target value obtained from the central control unit is different from the system data on the local system, a local control apparatus calculates the controlled variable for the voltage/reactive power control device needed to attain the control target value by using the correction function.

* * * * *